United States Patent
McGrogan, Jr.

[15] 3,676,702

[45] July 11, 1972

[54] COMPARATOR CIRCUIT

[72] Inventor: Ellwood Patrick McGrogan, Jr., Camden, N.J.

[73] Assignee: RCA Corporation

[22] Filed: Jan. 4, 1971

[21] Appl. No.: 103,736

[52] U.S. Cl. ..............................307/235, 307/304, 307/251, 307/279

[51] Int. Cl. ..............................H03k 5/20

[58] Field of Search ..............307/205, 221 C, 251, 279, 304, 307/214, 235

[56] References Cited

UNITED STATES PATENTS

| | | | |
|---|---|---|---|
| 3,275,996 | 9/1966 | Burns | 307/304 |
| 3,292,008 | 12/1966 | Rapp | 307/251 |
| 3,392,341 | 7/1968 | Burns | 330/13 |
| 3,449,594 | 6/1969 | Gibson et al. | 307/251 |
| 3,493,785 | 2/1970 | Rapp | 307/304 |
| 3,493,786 | 2/1970 | Ahrons et al. | 307/279 |
| 3,493,812 | 2/1970 | Weimer | 307/304 |
| 3,500,062 | 3/1970 | Annis | 307/304 |
| 3,577,166 | 5/1971 | Yung | 307/251 |

*Primary Examiner*—John S. Heyman
*Assistant Examiner*—Ro E. Hart
*Attorney*—H. Christoffersen

[57] ABSTRACT

A voltage comparator utilizing complementary MOS techniques. The comparator circuit includes an inverter network and switching circuitry for selectively supplying reference or monitored signals to the inverter network. A signal representative of the relationship between the reference and monitored signals is produced by the inverter network.

11 Claims, 3 Drawing Figures

PATENTED JUL 11 1972 3,676,702

INVENTOR.
Ellwood P. Mc Grogan, Jr.
BY
G. Donald Weber Jr.
ATTORNEY

COMPARATOR CIRCUIT

BACKGROUND AND CROSS REFERENCE

There are many applications of comparator circuits known in the art. Comparator circuits are frequently utilized to provide an output signal indicative of the relationship between a fixed or reference potential and a potential which is being monitored.

Reference is made to U.S. Pat. No. 3,260,863 to J.R. Burns etal. entitled "Threshold Circuit Utilizing Field Effect Transistors" and assigned to the common assignee. This patent describes a circuit utilizing field effect transistors of opposite conductivity types connected so as to provide an inverter circuit. An inverter circuit of the type described in the referenced patent is utilized in the instant invention.

SUMMARY OF THE INVENTION

There is provided a comparator circuit utilizing suitable semiconductor devices and techniques wherein at least two potentials (or similar signals) may be selectively compared and, thereby, monitored. The comparator circuit includes an inverter (or threshold) network and suitable switching circuitry whereby the aforementioned potentials are selectively applied to the inverter so that an output signal representative of the relative magnitude of the pair of potentials is provided.

DESCRIPTION OF THE PREFERRED EMBODIMENT

Figure 1:
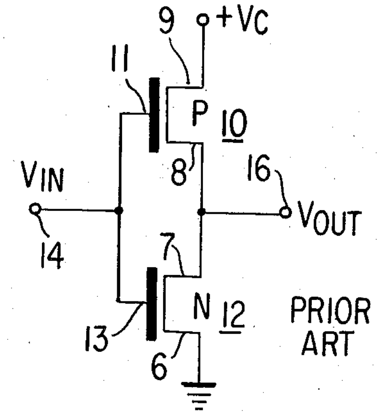
FIG. 1 is a schematic diagram of an inverter circuit known in the art.

Referring now to FIG. 1, a pair of semiconductors 10 and 12 are connected together. These semiconductors may be of the MOS type and should be of opposite conductivity types. In particular, each of the semiconductors includes first and second electrodes 6, 7 or 8, 9 which define a conduction path therebetween. In addition, each of the semiconductors includes a control electrode 11 or 13 which controls conduction in the aforesaid conduction path. The conduction paths of the semiconductors are connected together in series across a source of energizing potential $V_c$ so that one semiconductor functions as a load on the other. The control electrodes 11, 13 of the semiconductors are connected to each other so as to provide a common gating terminal for both transistors. Input signals are connected to the common gating terminal at input terminal 14. Output signals are derived from the common junction of the conductive paths of the semiconductorS and presented at output terminal 16.

Each of the semiconductors 10 and 12 may be an insulated-gate field-effect transistor, such as metal-oxide semiconductor (MOS) transistors, thin film transistors (TFT) or the like. Such transistors have been described in the literature. For example, MOS transistors are described in the the article entitled "The Silicon Insulated-Gate Field-Effect Transistor" by S.R. Hofstein and F.P. Heiman in the September 1963, Proceedings of the IEEE beginning on page 1,190 and thin film transistors are described in the article entitled "The TFT—A New Thin-Film Transistor" by P.K. Weimer in the June 1962, Proceedings of the IRE beginning on page 1,462. While any of the suitable type semiconductors may be utilized, the description herein is related to MOS type transistors for convenience.

Referring to U.S. Pat. No. 3,260,863, noted supra, there is a detailed description of the circuit shown in FIG. 1. Moreover, there is a detailed description of the operation of each of the components therein. A detailed description of these components is not included in this description. However, it is understood that the circuit shown in FIG. 1 operates as an inverter. Thus, the application of a relatively positive signal (with respect to ground potential) at input terminal 14 causes the signal to be applied at the common gating terminal of semiconductors 10 and 12. Since, as noted, the semiconductors are of the opposite conductivity type, opposite operation of these semiconductors occurs. For example, high level signals cause the P-type semiconductor 10 to be rendered nonconductive. However, this signal will cause the N-type semiconductor 12 to be rendered conductive. Thus, output terminal 16 is connected to ground (i.e. a relatively negative potential). Thus, it is seen that a positive input signal produces a relatively negative output signal wherein inversion occurs.

Conversely, a large, relatively negative input signal at input terminal 14 will cause semiconductor 10 to be rendered conductive and semiconductor 12 to be rendered nonconductive. With these conditions, output terminal 16 is connected to source $+V_c$. Consequently, a relatively negative input signal produces a relatively positive output signal wherein inversion again occurs.

Figure 2:
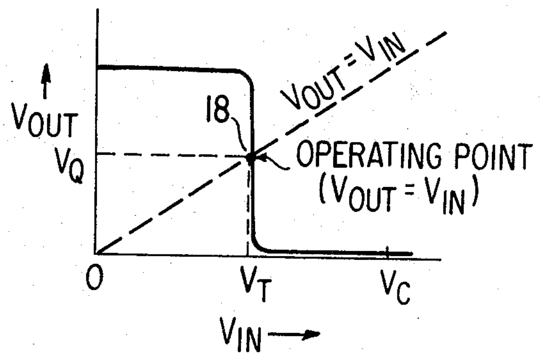
FIG. 2 is a graphic representation of the operating characteristics of the inverter circuit shown in FIG. 1.

This type of operation is suggested in the operating characteristic shown in FIG. 2. Thus, it is seen that when the input signal is high, (e.g. $V_{IN}$ approaches $V_c$, $V_{OUT}$ is approximately zero. However, when $V_{IN}$ is a relatively negative signal (i.e. below $V_t$ where $V_t$ is the threshold voltage of the circuit), $V_{OUT}$ is a relatively positive signal. As noted supra, this operation and this circuit are known in the art. By utilizing the techniques embodied in the operation of this circuit, the comparator circuit which embodies the instant invention is achieved.

Figure 3:
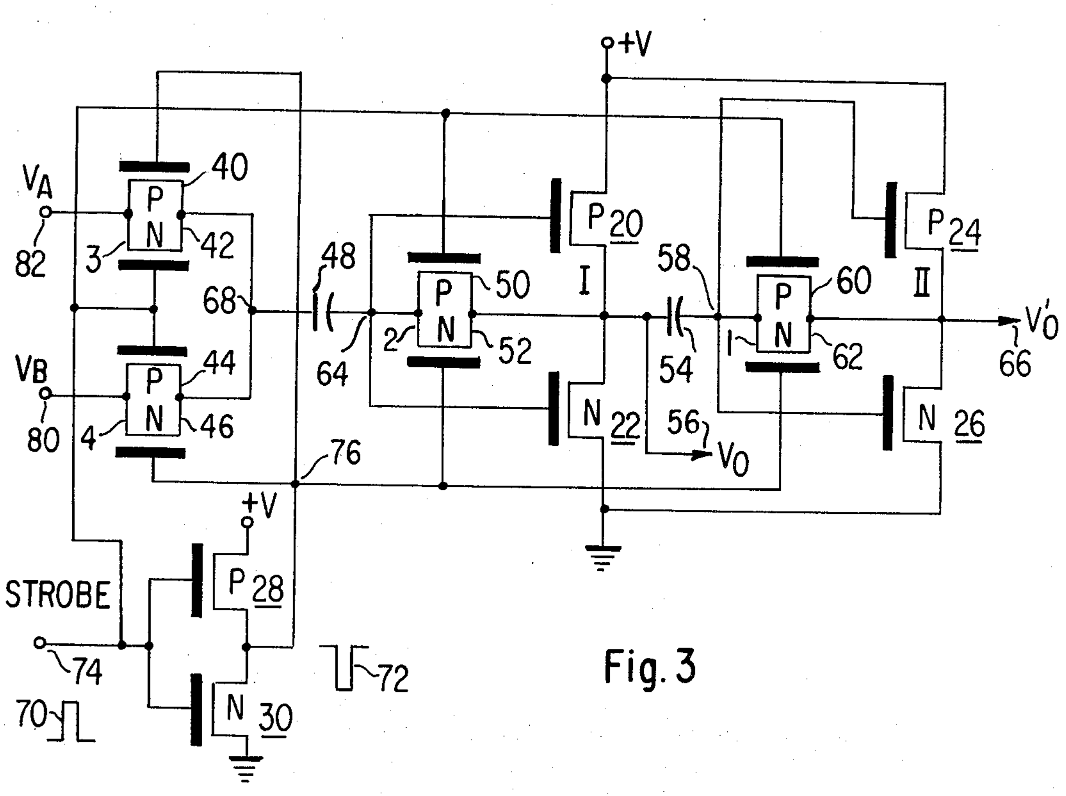
FIG. 3 is a schematic diagram of one embodiment of the comparator circuit of the instant invention.

Referring now to FIG. 3 there is shown a schematic diagram of one embodiment of the instant invention. The comparator circuit shown in FIG. 3 includes a first output inverter I which includes P-type semiconductor 20 and N-type semiconductor 22 connected in series between source +V and ground. Of course, the potentials designated may be varied in accordance with the application of the device. In addition, a second output inverter II includes P-type semiconductor 24 and N-type semiconductor 26 connected in series across the aforesaid voltage source. A control inverter including P-type semiconductor 28 and N-type semiconductor 30 is also connected across a suitable potential source. As suggested, each of these inverters may be connected across the same potential source. Moreover, in this description, it is the conduction paths of the respective semiconductors which are connected in series.

The common gating terminal of semiconductors 28 and 30 is connected to the input strobe terminal 74 where strobe signals 70 are selectively applied. In addition, input terminal 74 is connected to the common gating terminals of P-type semiconductor 44 and N-type semiconductor 42. One terminal of the conduction path of semiconductor 44 is connected to input terminal 80. A suitable potential $V_B$ which, in this embodiment, may represent a reference potential is supplied to terminal 80. The other terminal of the conduction path of semiconductor 44 is connected to common junction 68 at one side of capacitor 48. The conduction path of N-type semiconductor 46 is connected in parallel with the conduction path of semiconductor 44.

The conduction path of semiconductor 42 also has one terminal connected to common junction 68 and another terminal connected to input terminal 82 to which is supplied a potential $V_A$. In this embodiment, potential $V_A$ may be a potential which is to be monitored. The conduction path of P-type semiconductor 40 is connected in parallel with the conduction path of semiconductor 42.

The other terminal of capacitor 48 is connected to common junction 64. Common junction 64 is the common gating terminal of semiconductors 20 and 22 of output inverter I. In addition, common junction 64 is connected to one terminal of the conduction path of P-type semiconductor 50 and one terminal of the conduction path of N-type semiconductor 52. The other terminals of the conduction paths of semiconductors 50 and 52 are connected together and to the common junction of the conduction path of semiconductors 20 and 22.

The parallel combination of semiconductors 50 and 52 forms switch 2.

The common junction of semiconductors 20 and 22 is connected to output terminal 56 at which terminal the output signal $V_O$ is obtained. In addition, this terminal is connected to one side of capacitor 54. The other side of capacitor 54 is connected to common junction 58 which is the common gating terminal for semiconductors 24 and 26 of output inverter II. In addition, common junction 58 is connected to one terminal of the conduction path of P-type semiconductor 60 as well as to one terminal of the conduction path of N-type semiconductor 62. The other terminals of semiconductors 60 and 62 are connected together and to the common junction of semiconductors 24 and 26 at output terminal 66. The parallel combination of semiconductors 60 and 62 forms switch 1. At output terminal 66 the output signal $V_O'$ is obtained.

The gate electrode or terminal of semiconductor 60 is connected to the gating terminal of semiconductor 50 and to input terminal 74 to receive the strobe signal 70. The gating terminal of semiconductor 62 is connected to the gating terminal of semiconductor 52 along with the gating terminals of semiconductors 40 and 46 at common junction 76 which is connected to the common junction of semiconductors 28 and 30 of the strobe or control inverter. The inverted strobe signal 72 is supplied to common junction 76.

Initially, it is noted that the schematic diagram shown in FIG. 3 is one embodiment of the invention wherein increased sensitivity of the comparator is provided by cascading the first and second output inverters. In applications wherein such increased sensitivity is not required, the second output inverter (along with the associated circuitry) may be eliminated and the output signal taken at terminal 56. The circuit utilizing only one output inverter is, in most applications, more than satisfactory.

In describing the operation of the circuit as shown in FIG. 3, reference is concurrently made to the diagram of FIG. 2. In the circuit of FIG. 3, output inverters I and II are connected to voltages which exceed the sum of the individual threshold voltages of the associated semiconductors. For example, the source voltage +V exceeds the sum of the threshold voltages $V_t$ of both the P and N-type semiconductors 20 and 22. Likewise voltage +V exceeds the sum of the threshold voltages of semiconductors 24 and 26. With this condition there exists an operating point (e.g. point 18 of FIG. 2) at which both of the semiconductor devices are conductive so that the inverter functions as a voltage divider across the power supply. This operating point is characterized by a high gain for small signal voltages. The inverters can be biased at this operating point by connecting a high value resistance (not shown) from the output to the input thereof inasmuch as the D.C. input impedance of the inverter is virtually infinite. If such a resistor is utilized, a high resistance value is used to avoid degeneration of the gain.

In the normal or unstrobed condition, the output of inverter II is connected to the input thereof via transmission gate or switch 1. Similarly, the output of inverter I is connected to the input thereof via transmission gate or switch 2. The output voltage of each of the inverters is equivalent to $V_Q$ (see FIG. 2) which corresponds to the high gain operating point on the transfer characteristic for the inverter. However, each of the inverters will exhibit no gain inasmuch as this feedback is degenerative.

Also, in the unstrobed or normal condition, input terminal 80 is connected to capacitor 48 via switch 4 whereby capacitor 48 charges to the level $V_C = V_O - V_B$. In addition, capacitor 54 is quiescently charged to the difference between $V_{Q1}$ (the operating potential of inverter I) and $V_{Q2}$ (the operating potential of inverter II).

With the application of a strobe signal 70, a relatively positive going pulse is supplied at terminal 74. This signal is inverted by the control inverter so that a relatively negative going signal 72 is supplied to common terminal 76. The positive going strobe signal 70 renders semiconductors 44, 50 and 60 nonconductive. The same signal also renders semiconductor 42 conductive. Moreover, the inverted strobe signal at terminal 76 renders semiconductors 46, 52 and 62 nonconductive while rendering semiconductor 40 conductive. The change of state or condition of the several semiconductors renders switch 3 conductive and switches 1, 2 and 4 nonconductive. Consequently, the signal $V_A$ is supplied to capacitor 48 (via switch 3) while signal $V_B$ is disconnected therefrom. Moreover, the inverter feedback networks are removed from inverters I and II during the strobe signal. Consequently, any deviation defined by $V_B - V_A$ causes a signal to be supplied to the gating terminal of inverter I. Because of the large overall gain of the inverter, even a relatively small difference between $V_A$ and $V_B$ will cause the output of inverter I to assume either the +V or ground potential depending upon the polarity of the $V_A - V_B$ signal. The amplified signal can be detected at output terminal 56 to produce a signal $V_O$.

However, the signal can further be coupled via capacitor 54 to the gating terminals of semiconductors 24 and 26 to produce an output signal at terminal 66 which output signal is a function of the voltage change across capacitor 54. Obviously, the sensitivity of the network is increased inasmuch as a small difference at terminal 64 is converted to a large voltage swing at terminal 56 and again amplified by the operation of inverter II. The output signal (whether taken at terminal 56 or 66) can be sampled and stored by means of a flip-flop or suitable register until the next strobe signal is supplied in standard sample and hold techniques. That is, when the strobe signal 70 terminates the initial conditions noted supra are reinstated. Input signal $V_B$ applied at input terminal 80 is connected to capacitor 48 via switch 4 while terminal 82 is disconnected from capacitor 48 by switch 3. In addition, the feedback networks comprising switches 2 and 1 of inverters I and II, respectively, are connected.

Thus, there is shown and described a voltage comparator circuit which uses semiconductor devices. These semiconductor devices may be field-effect transistors or the like. In the particular embodiment shown, semiconductor devices of the MOS type are shown and described. More specifically, the circuit embodiment described uses complementary MOS techniques.

The circuit embodiment shown and described is a preferred embodiment. However, modifications thereto will be suggested to those skilled in the art. For example, the second inverter stage and associated circuit may be omitted unless increased sensitivity is required, as suggested supra. In addition, if the operating points $V_Q$ of the two inverters are substantially equal, capacitor 54 may be replaced by a short circuit if both the inverter networks are utilized. Moreover, the polarity requirements of the signals throughout the circuit may be inverted by making the necessary changes in the conductivity type of the semiconductors. These changes and modifications, as well as any others which fall within the purview of this invention are intended to be included in the invention as described in the claims appended hereto.

What is claimed is:

1. A comparator circuit comprising:

threshold circuit means, said threshold circuit means including a pair of semiconductor devices, each of said semiconductor devices having a conduction path and a control electrode for controlling the conduction by said conduction path, the conduction paths of said pair of semiconductors connected in series with each other and forming a common junction therebetween, the control electrodes of said pair of semiconductors connected together, and voltage source means connected across the series connected conduction paths of said pair of semiconductors such that said threshold circuit quiescently utilizes a prescribed operating point intermediate the limits of said voltage source means, a plurality of signal sources, storage means connected to the control electrodes of said pair of semiconductors in said threshold circuit means such that said storage means supplies a signal to said threshold circuit representative of the signals supplied by said signal sources, and switching means selectively connecting said storage means to one of said signal sources such that said threshold circuit means produces a signal representative of the condition of said one signal source.

2. The comparator circuit recited in claim 1 wherein said switching means includes first and second switching circuits connected between said storage means and different ones of said plurality of signal sources.

3. The comparator circuit recited in claim 1 wherein said switching means includes signal supplying means which selectively energizes said switching means to cause the connection between said storage means and said plurality of signal sources, said signal supplying means adapted to produce complementary output signals for application to said switching means.

4. The comparator circuit recited in claim 1 including second switch means connected from the connected together control electrodes of said pair of semiconductors of said threshold circuit means to the common junction of said series connected conduction paths of said pair of semiconductors.

5. The comparator circuit recited in claim 2 wherein said first and second switching circuits each comprise a pair of opposite conductivity type semiconductors, each of said semiconductors having a conduction path and a control electrode for controlling the conduction by said conduction path, each pair of opposite conductivity type semiconductors having the conduction paths thereof connected in parallel with each other and the control electrodes thereof connected to receive complementary control signals from said switching means, said first and second switching circuits connected to receive said control signals out-of-phase such that only one of said first and second switching circuits is conducting at a time.

6. The comparator circuit recited in claim 1 including second threshold circuit means connected to said first mentioned threshold circuit means, said second threshold circuit means including a second pair of semiconductor devices each having a conduction path and a control electrode for controlling the conduction by said conduction path, the conduction paths of said second pair of semiconductors connected in series with each other and forming a second common junction therebetween, the control electrodes of said second pair of semiconductors connected together, and voltage source means connected across the series connected conduction paths of said second pair of semiconductors such that said second threshold circuit quiescently utilizes a prescribed operating point intermediate the limits of said voltage source means, second storage means connected to the control electrodes of said pair of semiconductors in said second threshold circuit means such that said second storage means supplies a signal to said second threshold circuit representative of the signals supplied by said first mentioned threshold circuit means, and second switching means connected to said first mentioned switching means and operative therewith, said second switching means selectively controlling the operation of said second threshold circuit means.

7. A comparator circuit including first terminal means for receiving a reference signal, second terminal means for receiving a signal to be monitored, threshold circuit means, storage means connected to said threshold circuit means, first switch means connected from said first terminal means to said storage means, second switch means connected from said second terminal means to said storage means, and control means for selectively activating said first and second switch means alternatively whereby said storage means stores information representative of the relationship between the reference signal and the monitored signal selectively applied thereto via said first and second switch means, said threshold circuit means operative to produce an output signal representative of the information stored by said storage means whereby the relationship between the reference signal and the monitored signal is detected.

8. The comparator circuit recited in claim 7 wherein said threshold circuit means includes input and output terminals, said input terminal of said threshold circuit means connected to said storage means, and feedback circuit means connected from the output terminal of said threshold circuit to the input terminal thereof, said feedback means including third switch means connected to and activated by said control means.

9. A comparator circuit comprising, a pair of opposite conductivity MOS type semiconductors, each of said semiconductors having a conduction path defined by first and second electrodes and a third electrode for controlling the conduction in said conduction path, one of said first and second electrodes of each of said pair of semiconductors connected together in a common connection such that said conduction paths of said pair of semiconductors are connected in series, source means connected to the other of said first and second electrodes of said pair of semiconductors to apply a voltage across said series connected conduction paths, first and second input means, switch means connected to each of said first and second input means, storage means connected from said switch means to a common junction of said third electrodes of each of said pair of semiconductors, said switch means adapted to selectively effect an electrical connection from one of said first and second input means to said storage means, switchable feedback means connected from the common connection between said conduction paths of said pair of semiconductors to said common junction of said third electrodes of each of said pair of semiconductors, and signal supplying means for supplying signals to said switch means and to said switchable feedback means to control the operation thereof.

10. In combination, a first input terminal for receiving signals, a second input terminal for receiving signals, first switch means having one terminal thereof connected to said first input terminal, second switch means having one terminal thereof connected to said second input terminal, storage means having one terminal thereof connected to a further terminal of each of said first and second switch means, strobe means for supplying strobe signals which selectively activate said first and second switch means alternatively, inverter means having the input terminal thereof connected to a further terminal of said storage means, said inverter means producing an output signal level in accordance with the signal supplied to the input terminal thereof by said storage means, said signal supplied by said storage means being representative of the relationship between the signals received at said first and second input terminals.

11. The combination recited in claim 10 including second storage means having one terminal thereof connected to receive the output signal from said first mentioned inverter means, and second inverter means having the input terminal thereof connected to a further terminal of said second storage means.

* * * * *